United States Patent
Bachmann

(10) Patent No.: US 10,921,498 B2
(45) Date of Patent: Feb. 16, 2021

(54) ROTATING ARCHED HELIOGRAPH FOR CONTINUOUS VISUAL SIGNALING, DRONE TRACKING AND BIRD DETERRENT

(71) Applicant: Helmuth G. Bachmann, Salinas, CA (US)

(72) Inventor: Helmuth G. Bachmann, Salinas, CA (US)

( * ) Notice: Subject to any disclaimer, the term of this patent is extended or adjusted under 35 U.S.C. 154(b) by 169 days.

(21) Appl. No.: 16/172,641

(22) Filed: Oct. 26, 2018

(65) Prior Publication Data

US 2020/0132895 A1 Apr. 30, 2020

(51) Int. Cl.
| G02B 5/09 | (2006.01) |
| A01M 29/08 | (2011.01) |
| B64C 39/02 | (2006.01) |
| G08B 5/00 | (2006.01) |
| A01M 29/10 | (2011.01) |

(52) U.S. Cl.
CPC .............. *G02B 5/09* (2013.01); *A01M 29/08* (2013.01); *A01M 29/10* (2013.01); *B64C 39/024* (2013.01); *G08B 5/002* (2013.01); *B64C 2201/141* (2013.01)

(58) Field of Classification Search
CPC ........... G02B 5/09; G08B 5/002; A01M 29/08
USPC ....................................... 359/850
See application file for complete search history.

(56) References Cited

U.S. PATENT DOCUMENTS

| 1,813,874 A | 7/1931 | Eskilson |
| 1,823,240 A * | 9/1931 | Cobb ...................... G09F 13/00 359/525 |
| 2,395,605 A | 2/1946 | Young |
| 2,604,644 A | 7/1952 | Tilton |
| 3,383,675 A | 5/1968 | Allardice |
| 4,053,233 A | 10/1977 | Bien |
| 4,416,509 A | 11/1983 | Milan |
| 4,466,698 A * | 8/1984 | Gantz ...................... G08B 5/00 116/18 |
| 5,142,404 A * | 8/1992 | Shiraishi .................. G02B 5/09 250/236 |
| 5,173,603 A * | 12/1992 | Lindacher ................ G02B 5/09 250/236 |
| 5,650,871 A * | 7/1997 | Wilson ................. G02B 26/129 347/259 |
| 5,784,186 A * | 7/1998 | Wang ...................... G02B 5/09 359/200.1 |
| 6,053,409 A * | 4/2000 | Brobst ..................... G02B 5/09 235/462.06 |
| 6,219,168 B1 | 4/2001 | Wang |
| 6,375,358 B1 * | 4/2002 | Maekawa ............. F16C 33/109 384/107 |
| 2005/0193941 A1 | 9/2005 | Schlasinger |
| 2008/0239060 A1 * | 10/2008 | Jo ............................. G02B 5/09 347/259 |

(Continued)

FOREIGN PATENT DOCUMENTS

| JP | 2006087364 A | 4/2006 |
| WO | 1997011600 A1 | 4/1997 |
| WO | 2007116306 A2 | 2/2008 |

*Primary Examiner* — Ricky D Shafer

(57) ABSTRACT

This invention relates to a rotating heliograph with arched convex reflective mirror surfaces that provides an autonomous continuous flashing visual signal from the reflection of the Sun, that can be used for many applications such as a survival distress signal, drone (UAV) anti-collision/tracking, and as a bird deterrent.

8 Claims, 3 Drawing Sheets

(56) References Cited

U.S. PATENT DOCUMENTS

2015/0240866 A1\* 8/2015 Sakuragi ................ F16C 17/08
359/200.4

\* cited by examiner

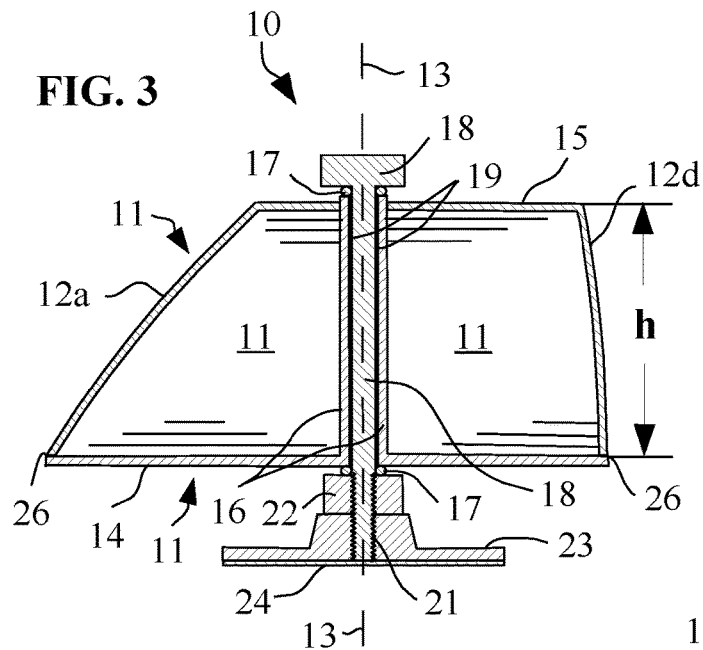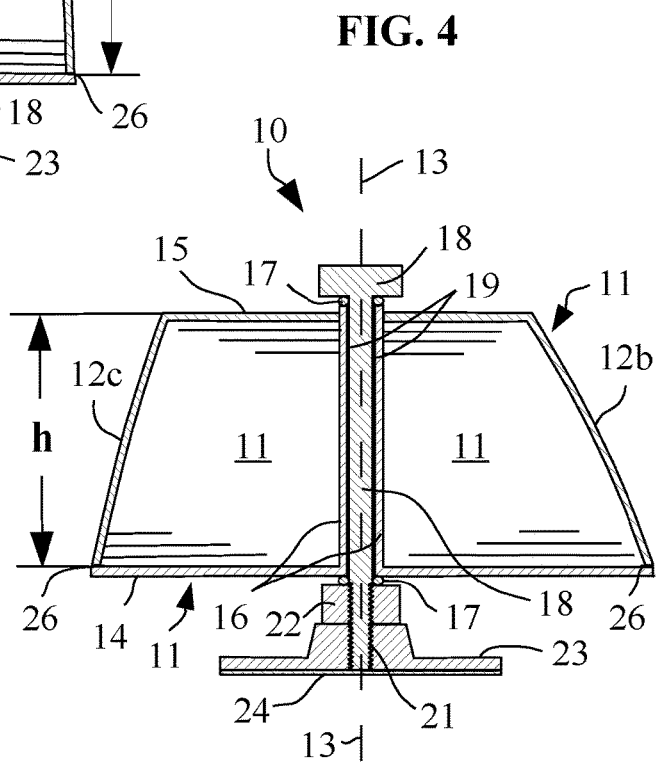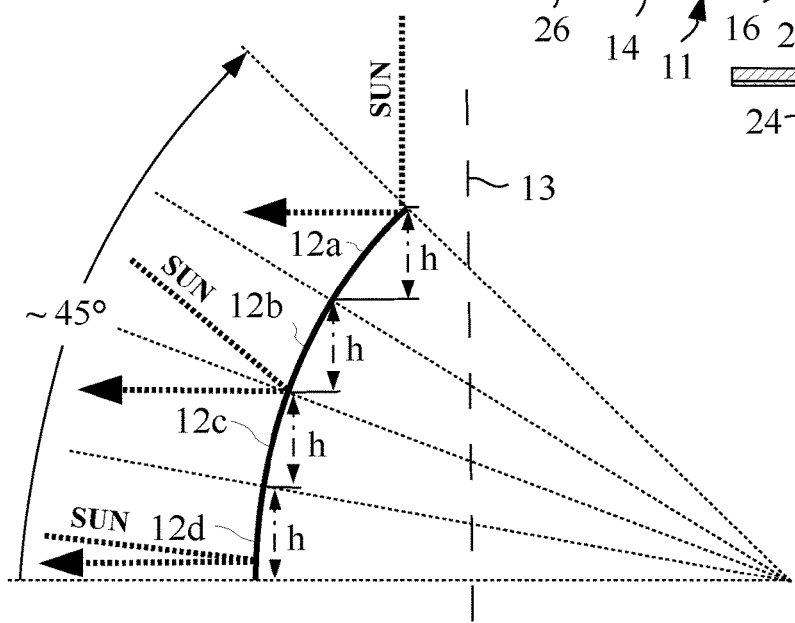

ROTATING ARCHED HELIOGRAPH FOR CONTINUOUS VISUAL SIGNALING, DRONE TRACKING AND BIRD DETERRENT

CROSS-REFERENCE TO RELAYED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to a rotating arched heliograph with arched convex reflective mirror surfaces that provides an autonomous continuous flashing visual signal from the reflection of the Sun, that can be used for many applications such as a survival distress signal, drone (UAV) anti-collision/tracking, and as a bird deterrent. The state of the art designs for heliographic survival distress signaling are hand held planar reflective mirrors that must be manually pointed at a recognized target in visual range as in U.S. Pat. No. 2,395,605A and US patent application US20050193941A1 (abandoned) that rotates but doesn't provide a continuous signal because the reflectors are plannar and there will be reflective gaps between each reflector, vertically along the rotational axis. Also, there is no rotational speed regulation which would greatly reduce the signal strength or flash time during fast rotation in stronger winds. Additionally, the design of the wind cups used for rotation will only function in a crosswind and would not provide any rotation if used on a drone (UAV) when hovering or at low speeds. Existing state of the art signaling devices for drones (UAVs), such as strobe lights, are commonly used to maintain a visual line of sight (VLOS) and collision avoidance at night. These electrically powered LED lights provide good visual tracking at night, but very short range in the daylight and consume valuable power. The current similar heliographic bird deterrents are described in WIPO patent applications WO2007116306A3 and WO2007116306A2, which both use rotating reflective surfaces set at different angles to project Sunlight, but again have vertical reflective gaps between each of the angled reflectors because they are planar, unlike the continuous convex reflective arches used in the description for this invention. Japanese patent application JP2006087364 is claimed as stationary with no flashing capability and that "at least one of the reflective mirrors is constituted by a convex mirror" and not several convex or arched mirrors set at different angles to provide a continuous reflective surface when rotating about a rotational axis as in the description of the embodiment for this invention.

BRIEF SUMMARY OF THE INVENTION

It is the object of this invention to disclose the drawbacks of existing prior art for existing day use of strobe lights for drones (UAVs) and provide a simpler more powerful and cost effective alternative.

It is a further object of this invention to disclose the drawbacks of existing prior art for existing heliographic survival distress signaling and provide an autonomous distress signal that covers most of the sky.

It is a further object of this invention to disclose the drawbacks of existing prior art for heliographic bird deterrents and provide a heliograph with no reflective gaps and maintains continuous flashing in most directions.

It is a further object of the present invention to provide a heliograph that can be wind powered for autonomous use.

BRIEF DESCRIPTION OF THE SEVERAL VIEWS OF THE DRAWING

FIG. 3 is a sectional view taken substantially along line 3-3 in FIG. 2 of a rotating arched heliograph;

FIG. 4 is a sectional view taken substantially along line 4-4 in FIG. 2 of a rotating arched heliograph;

FIG. 5 is a diagram of the reflective mirror surface angles of the rotating arched heliograph when rotated 360 degrees;

Corresponding reference numerals designate corresponding parts throughout several views of the drawings.

DETAILED DESCRIPTION OF THE INVENTION

Figure 1:
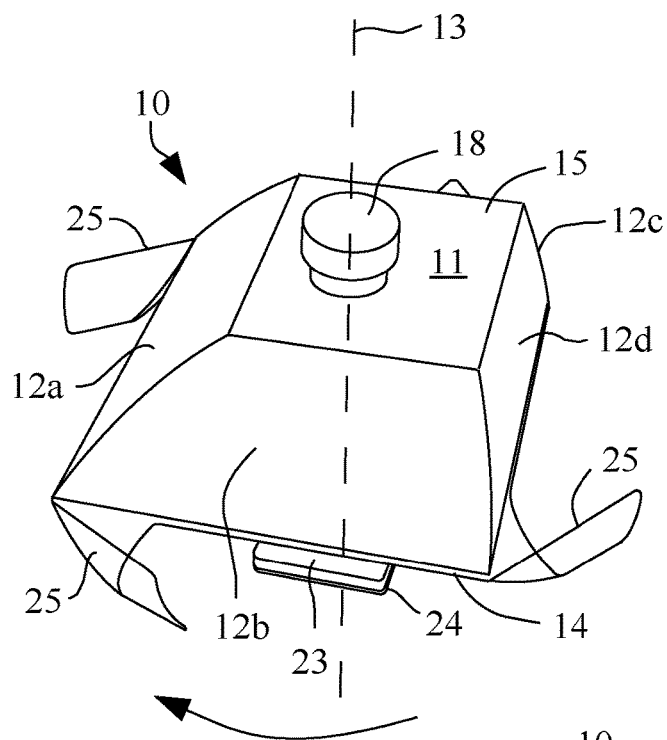
FIG. 1 is a side perspective view of a rotating arched heliograph embodying the invention.

Referring now to the drawings, and more particularly FIGS. 1 through 7, a rotating arched heliograph 10 having a rotationally balanced body 11 with a rotational axis 13 comprised of two or more arched convex reflective mirror surfaces, with the preferred embodiment of this invention having four arched convex reflective mirror surfaces 12a, 12b, 12c, 12d mounted adjacently around it's rotational axis 13 and arranged in a square with a base 14 and with a flat top 15 as shown in FIGS. 1 through 4. The arched convex reflective mirror surfaces 12a, 12b, 12c, 12d have individual outward diverging arcs of reflectivity along the rotational axis 13 and are positioned at different angles relative to the rotational axis 13 with the same height (h), where the combined sum of the arched convex reflective mirror surfaces 12a, 12b, 12c, 12d each intermittently reflect the Sun's rays and provide a continuous arc sum from 0 to a substantially 45 degree angle of reflectivity along the rotational axis 13 when rotated 360 degrees about the rotational axis 13, as shown in the FIG. 5. diagram. To maintain the same intensity of reflection with the decreasing width at the top of the arched convex reflective mirror surfaces 12a, 12b, 12c, 12d, the convexness of the arch may be deceasing or lessening to proportionally compensate from the top to bottom (not shown). As shown in FIGS. 3 and 4, for rotation the body 11 of the heliograph 10 houses an integral bearing sleeve 16 with oil seals 17 that rotates on a coaxial shaft bolt 18 with an oil lubricant 19 about the rotational axis 13. The shaft bolt 18 also has a thumb grip at the top end and threads 21 at the bottom end with a nut 22 securing it to the body 11, and hand screws onto the threaded base mount 23 for the attachment or detachment of the heliograph 10 from the base mount 23. The base mount 23 also has a foam backed peel off adhesive backing 24 on the bottom for the permanent attachment of the base mount 23 to a drone (UAV, Unmanned Aerial Vehicle) or other object such as a pole for use in agriculture or on a boat. For any application, the total reflective arc sum from 0 to a substantially 45 degree angle will reflect the Sun's rays horizontally when coming from any direction in the sky, except the reflection will be weaker or lost when the Sun is low and between the heliograph 10 and the observer. Although, when used on a drone (UAV), pilots will generally fly mostly away from the Sun in order to maintain a better visual line of sight (VLOS) and to cover the monitor's screen from the Sun's glare. Also, since the Sun is rarely 90 degrees overhead or at Sunset when flying, the heliograph 10 can still provide full coverage with a tilting rotational axis 13 on a drone (UAV) and mounting the heliograph 10 about 15 degrees at a backward pitch angle improves the overall coverage when hovering or at maximum speed (not shown). As mentioned, the heliograph 10 can be used for many applications such as a survival distress signal, drone (UAV) anti-collision/tracking (VLOS), and as a bird deterrent. The heliograph 10 can be made from all plastic components using the injection molding or thermoforming processes and use of a glue 26 to hold some components together. Also, plastic components will not interfere with GPS or magnetic compasses, which is essential on drones (UAVs).

Figure 2:
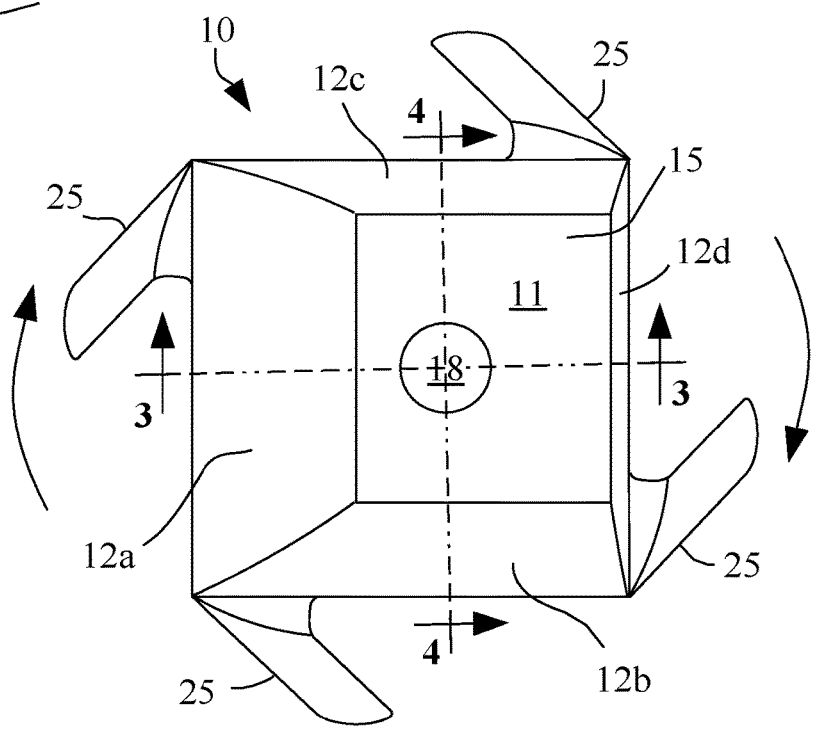
FIG. 2 is a top view of a rotating arched heliograph.
Figure 6:
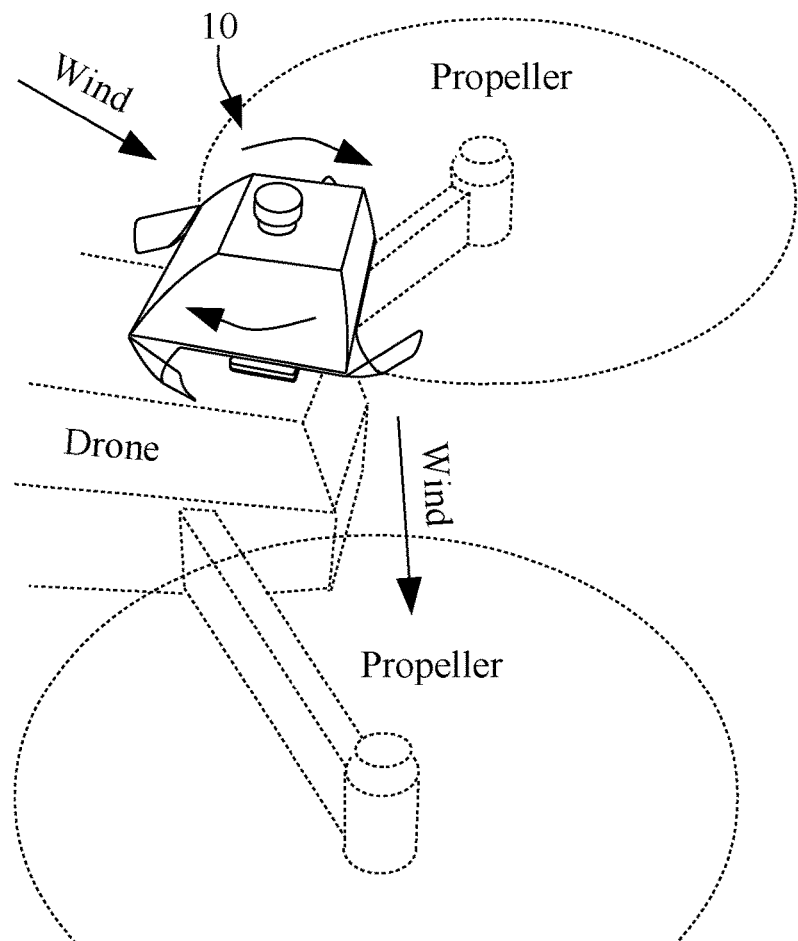
FIG. 6 is a side perspective view of a rotating arched heliograph and a partial view of the back end of a drone (UAV)
Figure 7:
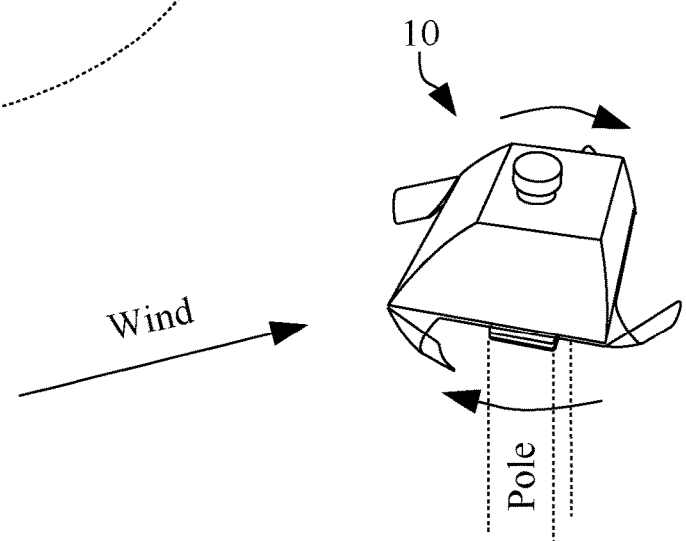
FIG. 7 is a side perspective view of a rotating arched heliograph mounted on a pole for other uses.

The rotation of the body 11 of the heliograph 10 can be powered by alternate means such as wind or an electrically powered motor (not shown). The preferred means for power as shown in FIGS. 1 and 2 is comprised of clear plastic turbine blades 25, each mounted on the square base 14 of the body 11 substantially orthogonal to the rotational axis 13 and angled toward each arched convex reflective mirror surfaces 12*a*, 12*b*, 12*c*, 12*d* substantially at a 45 degree angle, to utilize wind power either from the propeller wash and from forward motion of a drone (UAV), or from natural occurring wind in other applications as shown in FIGS. 6 and 7. Wind power is simpler and will not add substantial weight which would reduce the flight time of the drone (UAV). The rate of rotation is kept relatively constant and regulated by the use of proprietary non-Newtonian oil lubricant 19 between the bearing sleeve 16 and shaft bolt 18. The non-Newtonian oil lubricant 19 quickly increase the drag between the bearing sleeve 16 and shaft bolt 18 as a function of the rotational speed, which limits the speed and keeps it relatively constant for different applications or to comply with FAA aircraft anti-collision light system regulations, of not less than 40, nor more than 100 cycles per minute, and minimum light intensity (flash duration). For more precise rotation control, other rotational control regulators can be connected between the shaft bolt 18 and bearing sleeve 16 (not shown). The slower rotational cycles per minute increases the duration or flash time of the Sun's reflection and visual intensity; at 60 cycles per minute visibility is still strong at more that one mile with arched convex reflective mirror surfaces 12*a*, 12*b*, 12*c*, 12*d* having a base width of 2.25 inches. Drones (UAVs) could also have a lower cycle per minute requirement than 40 in order to be distinguished from regular manned aircraft. If additional navigation regulations are imposed on drones (UAVs) by the FAA resulting from the FAA Reauthorization Act of 2018, the heliograph 10 could be useful as a clear weather anti-collision device, especially on very small drones (UAVs), and possibly in conjunction with electronic night strobes or ADS-B tracking devices, if they are required by the FAA. Additionally, the heliograph 10 can function as a drone (UAV) bird deterrent in flight or as a surveillance warning to intruders on the ground.

In the use of the heliograph 10 as a bird deterrent in agricultural or as a rescue signal device, the heliograph 10 can be mounted on a pole or a stake as shown in FIG. 7. Also, it's size would be considerably larger with a greater reflective intensity where size, weight and wind drag are not an issue as on a drone (UAV).

The present invention has been fully described by way of example with the accompanying drawings. Various alternations and changes can be made without departing from the spirit and broader aspects of the invention as set forth in the appending claims, which are to be interpreted in accordance with the principles of patent law including the doctrine of equivalents.

I claim:

1. A rotating arched heliograph, comprising a body with two or more arched convex reflective mirror surfaces positioned on said body adjacently around a rotational axis each with an outward diverging arc of reflectivity along said rotational axis and at different angles relative to said rotational axis, wherein the sum of the arched convex reflective mirror surfaces intermittently provide an arc sum of reflectivity when rotated 360 degrees about said rotational axis;
    a bearing sleeve housed in said body with a coaxial shaft bolt that is mounted onto a base mount, wherein said bearing sleeve and said body rotates on said shaft bolt;
    a non-Newtonian oil lubricant between said bearing sleeve and said shaft bolt on said body, wherein said non-Newtonian oil lubricant controls rotational speed of said rotating arched heliograph by quickly increasing drag between said shaft bolt and said bearing sleeve as a function of the rotational speed, which limits the speed and keeps it relatively constant.

2. The rotating arched heliograph of claim 1 wherein said arched convex reflective mirror surfaces combine to reflect a continuous arc sum from 0 to a substantially 45 degree angle of intermittent reflectivity.

3. The rotating arched heliograph of claim 1 wherein said body has four arched convex reflective mirror surfaces arranged in a square with a base and a flat top.

4. The rotating arched heliograph of claim 1 wherein said rotating arched heliograph provides clear weather anti-collision visual signaling and tracking for a drone (UAV) and an aircraft.

5. The rotating arched heliograph of claim 4 wherein said body is made of plastic and will not interfere with the GPS or magnetic compass on said drone (UAV).

6. A rotating arched heliograph, comprising a body with two or more arched convex reflective mirror surfaces positioned on said body adjacently around a rotational axis each with an outward diverging arc of reflectivity along said rotational axis and at different angles relative to said rotational axis, wherein the sum of the arched convex reflective mirror surfaces intermittently provide an arc sum of reflectivity when rotated 360 degrees about said rotational axis;
    a bearing sleeve housed in said body with a coaxial shaft bolt that is mounted onto a base mount, wherein said bearing sleeve and said body rotates on said shaft bolt;
    a non-Newtonian oil lubricant between said bearing sleeve and said shaft bolt on said body, wherein said non-Newtonian oil lubricant controls rotational speed of said rotating arched heliograph by quickly increasing drag between said shaft bolt and said bearing sleeve as a function of the rotational speed, which limits the speed and keeps it relatively constant;
    a turbine blade(s) mounted on said body, wherein said rotating arched heliograph is rotated by wind power either from propeller wash and forward motion of a drone (UAV), or from natural occurring wind.

7. The rotating arched heliograph of claim 6 wherein said shaft bolt is detachable from said base mount, wherein said body is attachable and detachable from said base mount.

8. The rotating arched heliograph of claim 7 further comprises a peel off adhesive backing on said base mount, wherein said base mount is permanently attached onto an object.

\* \* \* \* \*